United States Patent
Fujii

(10) Patent No.: US 12,227,029 B2
(45) Date of Patent: Feb. 18, 2025

(54) PNEUMATIC TIRE

(71) Applicant: The Yokohama Rubber Co., LTD., Tokyo (JP)

(72) Inventor: Hiroshi Fujii, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 187 days.

(21) Appl. No.: 17/055,481

(22) PCT Filed: Dec. 25, 2018

(86) PCT No.: PCT/JP2018/047665
§ 371 (c)(1),
(2) Date: Nov. 13, 2020

(87) PCT Pub. No.: WO2019/220680
PCT Pub. Date: Nov. 21, 2019

(65) Prior Publication Data
US 2021/0221177 A1 Jul. 22, 2021

(30) Foreign Application Priority Data
May 15, 2018 (JP) .................. 2018-093906

(51) Int. Cl.
*B60C 11/00* (2006.01)
*B60C 11/03* (2006.01)
*B60C 11/04* (2006.01)

(52) U.S. Cl.
CPC ........ *B60C 11/005* (2013.01); *B60C 11/0008* (2013.01); *B60C 11/033* (2013.01);
(Continued)

(58) Field of Classification Search
CPC ................ B60C 11/005; B60C 11/033; B60C 2011/0025; B60C 2011/0033
See application file for complete search history.

(56) References Cited

U.S. PATENT DOCUMENTS 5,228,933 A * 7/1993 Kawabata ............... B60C 11/00
152/526
5,479,977 A * 1/1996 Tamano ............... B60C 15/0018
152/554
(Continued)

FOREIGN PATENT DOCUMENTS

CN 102632772 A 8/2012
CN 108407552 A * 8/2018
(Continued)

OTHER PUBLICATIONS

Machine translation for China 108407552 (Year: 2022).*
(Continued)

*Primary Examiner* — Steven D Maki
(74) *Attorney, Agent, or Firm* — Thorpe North & Western

(57) ABSTRACT

A pneumatic tire is provided. An average thickness of an undertread rubber in a center region is greater than that in a shoulder regions, a loss tangent tan δ at 60° C. of the cap tread rubber is higher than that of the undertread rubber, and the ratio CAI/UAI of a cross-sectional area CAI of the cap tread rubber to a cross-sectional area UAI of the undertread rubber is not less than 0.15 and not greater than 0.95 in the center region.

13 Claims, 2 Drawing Sheets

(52) U.S. Cl.
CPC ....... *B60C 11/04* (2013.01); *B60C 2011/0025* (2013.01); *B60C 2011/0033* (2013.01)

(56) References Cited

U.S. PATENT DOCUMENTS

| | | | |
|---|---|---|---|
| 2002/0079033 A1 | 6/2002 | Suzuki | |
| 2004/0211501 A1 | 10/2004 | Kajita | |
| 2012/0132332 A1 | 5/2012 | Zhao et al. | |
| 2015/0083293 A1 | 3/2015 | Zhao et al. | |
| 2022/0063341 A1* | 3/2022 | Tomomatsu | ........ B60C 11/0302 |

FOREIGN PATENT DOCUMENTS

| | | | | |
|---|---|---|---|---|
| EP | 2676808 A1 | * | 12/2013 | |
| JP | S62-006113 | | 1/1987 | |
| JP | 06-055811 U | * | 8/1994 | |
| JP | 07-061214 A | * | 3/1995 | |
| JP | H09-150605 | | 6/1997 | |
| JP | 2005-138739 A | * | 6/2005 | |
| JP | 2008-273485 | | 11/2008 | |
| JP | A 2009-073245 | | 4/2009 | |
| JP | 2016-068834 | | 5/2016 | |
| JP | 2016-084046 A | | 5/2016 | |
| JP | 2017-024714 A | * | 2/2017 | |
| JP | 2017-105411 | | 6/2017 | |

OTHER PUBLICATIONS

Machine translation for Japan 06-055811 U (Year: 2022).*
Machine translation for Japan 2017-024714 (Year: 2022).*
Machine translation for Japan 2005-138739 (Year: 2022).*
Machine translation for Japan 07-061214 (Year: 2022).*
International Search Report for International Application No. PCT/JP2018/047665 dated Apr. 9, 2019, 4 pages, Japan.

* cited by examiner

PNEUMATIC TIRE

TECHNICAL FIELD

The present technology relates to a pneumatic tire with reduced tire noise, reduced rolling resistance, and improved steering stability performance.

BACKGROUND ART

In recent years, there has been concern about the influence of automobile noise on the global environment, and various proposals have been made regarding techniques for reducing noise during tire rotation among components of automobile noise.

For example, a pneumatic tire with reduced tire noise during traveling has been proposed in which protrusions extending along an opening end edge on a trailing side in a tire rotation direction are formed on a surface of an outer land portion, and apexes of the protrusions are located closer to an inner side in a radial direction than a circumferential tangential line of an opening end edge on a leading side in the tire rotation direction (Japan Unexamined Patent Publication No. 2017-105411). In Japan Unexamined Patent Publication No. 2017-105411, a protrusion is formed on the surface of a tread, and a vibration width in the tire width radial direction of a belt layer in a portion that overlaps the protrusion is suppressed to reduce the tire noise.

A pneumatic tire with an improved noise performance has been proposed in which a circumferential belt includes a tire equator, a region in a tire width direction having a width in the tire width direction of 0.2 times or greater and 0.7 times or smaller than the maximum width in the tire width direction of the circumferential belt is a center region, the rigidity in the tire circumferential direction per unit width of any portion of the center region is greater than the rigidity in the tire circumferential direction per unit width of any portion of both adjacent shoulder regions, and a width of one shoulder region is 1.5 times or greater and 8.0 times or smaller than the width of the other shoulder region (Japan Unexamined Patent Publication No. 2016-68834). In Japan Unexamined Patent Publication No. 2016-68834, the rigidity of the circumferential belt is increased to reduce noise emission, the widths of the two shoulder regions of the circumferential belt are made asymmetric so that the vibration modes in these shoulder regions are different and the peak level of sound is lowered. In this way, tire noise is reduced.

As described above, in Japan Unexamined Patent Publication Nos. 2017-105411 and 2016-068834, the tire noise is reduced on the basis of effects caused by a so-called tire structure, such as formation of protrusions and improvements in the circumferential belt. However, generally, the selection of the rubber material to be used in the tread rubber has a greatly effect on reducing the tire noise, but, no knowledge about the selection of such a material is disclosed in Japan Unexamined Patent Publication Nos. 2017-105411 and 2016-068834. Therefore, there is room for further improvement in the techniques of Japan Unexamined Patent Publication Nos. 2017-105411 and 2016-068834

In recent years, it is often required to reduce rolling resistance in order to reduce fuel consumption and improve the steering stability performance so that the sense of security of the driver is enhanced as well as reducing the tire noise. Furthermore, it is expected that reduction of the driver's burden and safe steering of an automobile while considering the global environment will be required at a higher level in the future.

SUMMARY

The present technology provides a pneumatic tire which realizes reduction of tire noise, reduction of rolling resistance, and improvement in steering stability performance in a well-balanced manner.

A pneumatic tire according to an embodiment of the present technology includes: a carcass including at least one carcass plies; a belt including a belt layer including cords, the belt being disposed on an outer side in a tire radial direction of the carcass; and a tread rubber disposed on the outer side in the tire radial direction of the belt, the tread rubber constituting a portion of a tread portion, at least one circumferential main grooves having a total width of 15% or greater of a ground contact width being formed in the tread portion, the tread rubber including an undertread rubber and a cap tread rubber formed on the outer side in the tire radial direction of the undertread rubber, the cap tread rubber being formed from rubber having a hardness higher than that of the undertread rubber, in a state in which the pneumatic tire is mounted on a specified rim, inflated to 75% of a specified internal pressure, and loaded with a load of 100% of a maximum load capacity, when two regions at a center in a tire width direction obtained by dividing a tire ground contact width into four regions in a tire meridian cross-sectional view are a center region and remaining two regions are shoulder regions, an average thickness of the undertread rubber in the center region being greater that of the shoulder region, a loss tangent tan δ at 60° C. of the cap tread rubber being higher than that of the undertread rubber, in a region of the center region, located closer to an inner side in the tire radial direction than an imaginary line that extends in parallel to a tire profile line at a position located 1.6 mm on the outer side in the tire radial direction from a groove bottom of the circumferential main groove, a ratio CAI/UAI of a cross-sectional area CAI of the cap tread rubber to a cross-sectional area UAI of the undertread rubber being not less than 0.15 and not greater than 0.95.

In the pneumatic tire according to an embodiment of the present technology, improvements are added particularly to the relationship between the average thicknesses of the undertread rubber in the center region and the shoulder region, the relationship between the loss tangents tan δ of the undertread rubber and the cap tread rubber, and the relationship between the cross-sectional area CAI of the cap tread rubber and the cross-sectional area UAI of the undertread rubber in the center region as well as the relationship between the hardnesses of the undertread rubber and the cap tread rubber. As a result, a pneumatic tire according to an embodiment of the present technology can improve the tire noise, the rolling resistance, and the steering stability performance in a well-balanced manner.

DETAILED DESCRIPTION

Pneumatic tires according to embodiments (Basic Embodiment and Additional Embodiments 1 to 5 illustrated below) of the present technology are described in detail below with reference to the drawings. Note that the present technology is not limited to these embodiments. Constituents of the following embodiments include components that are substantially identical or that can be substituted or easily conceived by one skilled in the art. In addition, various modes included in the embodiments can be combined as desired within the scope of obviousness by one skilled in the art.

Basic Embodiment

The following is a description of the Basic Mode of the pneumatic tire according to an embodiment of the present technology. Herein, "tire radial direction" refers to the direction orthogonal to the rotation axis of the pneumatic tire. "Inward in the tire radial direction" refers to the direction toward the rotation axis in the tire radial direction. "Outward in the tire radial direction" refers to the direction away from the axis of rotation in the tire radial direction. "Tire circumferential direction" refers to the circumferential direction with the rotation axis as the center axis. Moreover, "tire width direction" refers to a direction parallel to the rotation axis, "inner side in the tire width direction" refers to a side toward a tire equatorial plane (tire equator line) in the tire width direction, and "outer side in the tire width direction" refers to a side away from the tire equatorial plane in the tire width direction. Note that "tire equatorial plane CL" refers to the plane orthogonal to the rotation axis of the pneumatic tire, the plane passing through the center of the tire width of the pneumatic tire.

Figure 1:
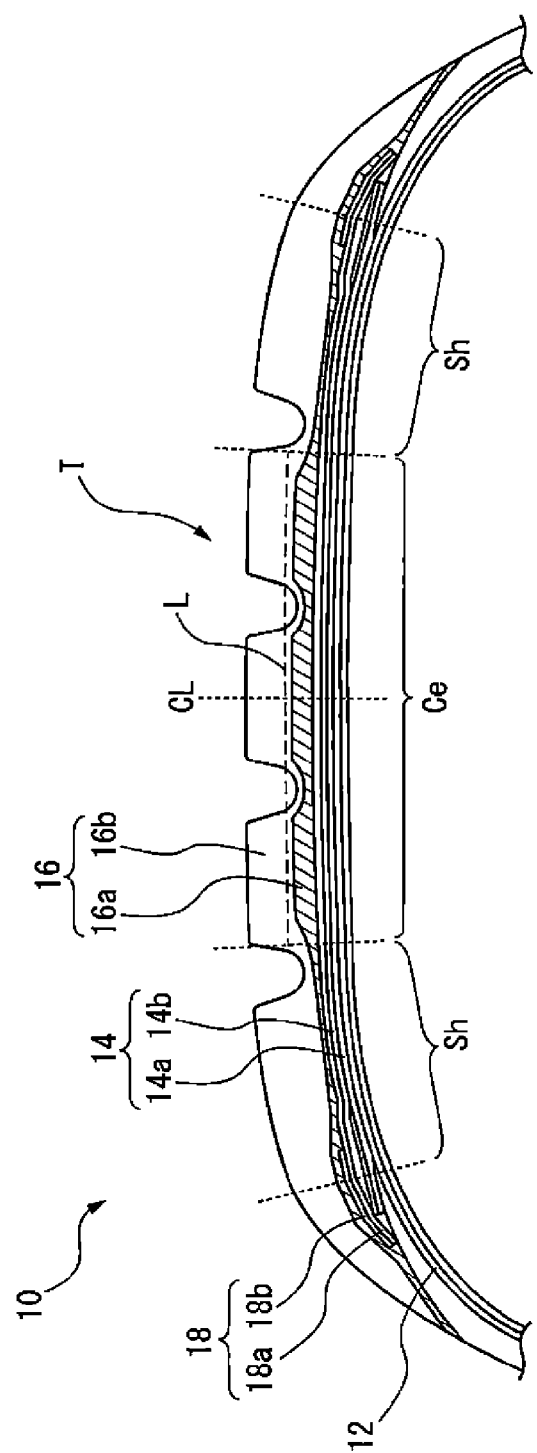
FIG. 1 is a tire meridian cross-sectional view illustrating a pneumatic tire according to an embodiment of the present technology.

FIG. 1 is a tire meridian cross-sectional view illustrating a pneumatic tire according to an embodiment of the present technology. Note that FIG. 1 illustrates a state in which a pneumatic tire 10 is mounted on a specified rim, inflated to 75% of a specified internal pressure, and loaded with a load of 100% of the maximum load capacity. The pneumatic tire 10 illustrated in the same drawing includes a carcass 12 including at least one carcass plies (one carcass ply is illustrated in the same drawing), a belt 14 including belt layers 14a and 14b including cords, disposed on an outer side in the tire radial direction of the carcass 12, and a tread rubber 16 disposed on the outer side in the tire radial direction of the belt 14 and constituting a portion of a tread portion T. Note that in the example illustrated in FIG. 1, a belt cover 18 including two belt cover layers 18a and 18b is formed on the outer side in the tire radial direction of the belt layer 14b so as to cover the outer end portions in the tire width direction of the belt layers 14a and 14b.

Here, "specified rim" refers to an "applicable rim" defined by the Japan Automobile Tyre Manufacturers Association (JATMA), a "Design Rim" defined by the Tire and Rim Association (TRA), and a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. "Maximum load capacity" refers to the "maximum load capacity" defined by JATMA, the maximum value in "TIRE LOAD LIMITS AT VARIOUS COLD INFLATION PRESSURES" defined by TRA, or to the "LOAD CAPACITY" defined by ETRTO.

Figure 2:
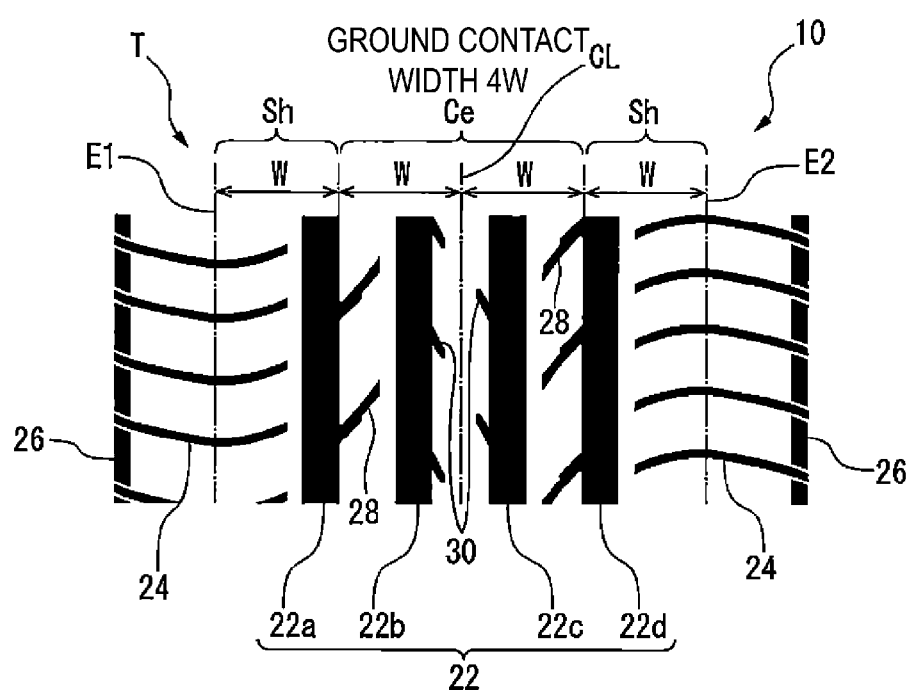
FIG. 2 is a plan view illustrating a tread pattern of the pneumatic tire according to the present embodiment illustrated in FIG. 1.

FIG. 2 is a plan view illustrating a tread pattern of the pneumatic tire according to the present embodiment illustrated in FIG. 1. Note that the reference signs E1 and E2 in FIG. 2 indicate the ground contact edge lines (lines along which continuous ground contact edges are connected in the tire circumferential direction). As illustrated in FIG. 2, four circumferential main grooves 22 (22a to 22d) having a total width of 15% or greater of the ground contact width is formed in the tread portion T of the pneumatic tire 10. Here, "main groove" refers to a groove on which a wear indicator must be provided as specified by JATMA and typically has a width of 2% or greater of the tread width TW. Note that in the present specification, "groove width" refers to the dimension between adjacent land portions measured in a direction perpendicular to the extension direction of the grooves in the opening portion of the groove. Note that in the example illustrated in FIG. 2, in addition to the circumferential main grooves 22, lug grooves 24, circumferential narrow grooves 26, and inclined grooves 28 and 30 are formed as illustrated in the same drawing.

In the pneumatic tire 10 of the present embodiment, as illustrated in FIG. 1, the tread rubber 16 includes an undertread rubber 16a (a hatched portion in the same drawing) and a cap tread rubber 16b formed on the outer side in the tire radial direction of the undertread rubber 16a and formed from rubber having a hardness higher than that of the undertread rubber 16a. The undertread rubber 16a is a portion that performs a buffering role with respect to different behaviors when the belt 14 and the cap tread rubber 16b exhibit different behaviors during traveling to reduce tire noise, and it is effective to use a relatively soft rubber for the undertread rubber 16a. In contrast, the cap tread rubber 16b is a portion that comes into contact with the road surface during traveling. It is effective to use a relatively hard rubber for the cap tread rubber 16b from the perspective of wear resistance and the like.

Under the assumptions as described above, in the pneumatic tire 10 of the present embodiment, as illustrated in FIG. 1, in a state in which the pneumatic tire 10 is mounted on a specified rim, inflated to 92% of a specified internal pressure, and loaded with a load of 75% of the maximum load capacity, when two regions at the center in the tire width direction obtained by dividing a tire ground contact width 4W into four regions in the tire meridian cross-sectional view are a center region Ce and the remaining two regions are shoulder regions Sh and Sh, the average thickness of the undertread rubber 16a in the center region Ce is greater that of the shoulder region Sh.

In the pneumatic tire 10 of the present embodiment, the cap tread rubber 16b has a greater loss tangent tan δ ([loss modulus]/[storage modulus]) at 60° C. than the undertread rubber 16a.

In the pneumatic tire 10 of the present embodiment, in a region of the center region Ce, located closer to the inner side in the tire radial direction than an imaginary line L that extends in parallel to a tire profile line (the outer contour of the tire when the groove is not present) at a position located 1.6 mm on the outer side in the tire radial direction from the groove bottom of the circumferential main groove 22, the ratio CAI/UAI of the cross-sectional area CAI of the cap tread rubber 16b to the cross-sectional area UAI of the undertread rubber 16a is not less than 0.15 and not greater than 0.95.

Effects

In the pneumatic tire according to the present embodiment, the average thickness of the undertread rubber 16a in the center region Ce is greater than that in the shoulder region Sh in the tire meridian cross-sectional view illustrated in FIG. 1. Due to this, the tire noise can be reduced since a large amount of the relatively soft undertread rubber 16a is used in the center region Ce that always comes into contact with the road surface. Moreover, the rolling resistance is reduced without excessively increasing the ground contact width since the average thickness of the undertread rubber 16a is relatively small in the shoulder region Sh so that sufficient deflection is possible during traveling. Furthermore, the block rigidity is improved and the steering stability performance can be improved since the percentage of the cap tread rubber is increased in the shoulder region Sh (Effect 1).

In the pneumatic tire according to the present embodiment, the cap tread rubber 16b has a higher loss tangent tan δ ([loss modulus]/[storage modulus]) at 60° C. than the undertread rubber 16a. Here, 60° C. is selected because the tensile strain frequency at 60° C. is substantially the same frequency as the deformation frequency of one revolution of the tire. It is known that the loss tangent tan δ depends on (specifically proportional to) the tensile strain frequency, and therefore, if the tensile strain frequency is the same, it can be determined that the loss tangent tan δ is substantially the same.

Since such a loss tangent tan δ is selected, by using a rubber having a relatively high viscosity for the cap tread rubber 16b, the frictional force of the rubber can be improved. As a result, the grip during cornering can be improved and steering stability can be improved (Effect 2).

In the pneumatic tire of the present embodiment, by setting the ratio CAI/UAI to 0.15 or greater, in a state where the cap tread rubber 16b is worn due to traveling of a certain degree, it is possible to increase the block rigidity and realize excellent steering stability performance without excessively increasing the percentage of the soft undertread rubber 16a (Effect 3). In contrast, by setting the ratio CAI/UAI to 0.95 or less, in a state where the cap tread rubber 16b is worn due to traveling of a certain degree, it is possible to reduce the tire noise without excessively increasing the percentage of the hard cap tread rubber 16b (Effect 4).

Note that the ratio CAI/UAI is preferably not less than 0.2 and not greater than 0.9, and more preferably not less than 0.25 and not greater than 0.85.

As described above, in the pneumatic tire according to the present embodiment, by adding improvements to the ratio TW/SW and the ratio CW100/CW70, it is possible to realize reduction of tire noise, reduction of rolling resistance, and improvement in steering stability performance in a well-balanced manner in addition to Effects 1 to 4.

Although not entirely illustrated, the pneumatic tire according to the present embodiment described above has the same meridian cross-sectional shape as a conventional pneumatic tire. That is, in a meridian cross-sectional view, the pneumatic tire according to the present embodiment includes bead portions, sidewall portions, shoulder portions, and the tread portion in that order from the inner side to the outer side in the tire radial direction. For example, in a meridian cross-sectional view, the pneumatic tire includes a carcass layer that extends from the tread portion to the bead portions on both sides and is wound around a pair of bead cores and the above-described belt layer and a belt cover layer on the outer side in the tire radial direction of the carcass layer.

The pneumatic tire according to the present embodiment is obtained through various general manufacturing processes, in other words, a step of mixing tire materials, a step of processing the tire materials, a step of molding a green tire, a vulcanization step, an inspection step after vulcanization, and the like. When manufacturing the pneumatic tire according to the present embodiment, for example, recess portions and protrusion portions corresponding to the tread pattern illustrated in FIG. 2 are formed in the inner wall of a vulcanization mold.

Additional Embodiments

Next, Additional Embodiments 1 to 5 that can optionally be implemented on Basic Embodiment of the pneumatic tire according to an embodiment of the present technology are described.

Additional Embodiment 1

In Basic Embodiment, the difference between the hardness of the cap tread rubber 16b illustrated in FIG. 1 and the hardness of the undertread rubber 16a is preferably greater than 5 and less than 15 in JIS (Japanese Industrial Standard) hardness (Additional Embodiment 1).

Here, JIS hardness is a value measured by a method using a durometer as a meter, as defined by JIS K 6253.

Since the hardness difference is greater than 5 in JIS hardness, the undertread rubber 16b can perform a buffering role at a high level with respect to different behaviors when the belt 14 and the cap tread rubber 16b exhibit different behaviors during traveling, and the wear resistance or the like during traveling can be realized at a high level in the cap tread rubber 16b.

In contrast, since the hardness difference is less than 15 in JIS hardness, it is possible to prevent the hardness of the undertread rubber 16b from becoming too low and prevent the entire tread rubber 16 from becoming too soft. Thus, it is possible to improve the block rigidity and further increase the steering stability performance.

The hardness difference is more preferably not less than 6 and not greater than 14 in JIS hardness and most preferably not less than 7 and not greater than 13.

Additional Embodiment 2

In Basic Embodiment and an embodiment in which Additional Embodiment 1 is added to Basic Embodiment, a groove area ratio in the center region Ce illustrated in FIGS. 1 and 2 is preferably smaller than a groove area ratio in the shoulder region Sh (Additional Embodiment 2). Here, "groove area ratio" refers to the groove ratio in the tread surface for each of the center region Ce and the shoulder region Sh.

By setting the groove area ratio in the center region Ce to be smaller than the groove area ratio in the shoulder regions Sh, the number of grooves can be relatively decreased in the center region Ce, and therefore, it is possible to increase the block rigidity and further increase the steering stability performance. In contrast, since the number of grooves can be relatively increased in the shoulder regions Sh, the percentage of the undertread rubber 16a where grooves are not formed can be increased, and the tire noise can be further reduced. Additionally, the total volume of the tread rubber in the shoulder region Sh can be decreased, and thus the rolling resistance can be further reduced.

Additional Embodiment 3

In Basic Embodiment and an embodiment in which at least one of Additional Embodiments 1 and 2 is added to Basic Embodiment, in a region of the tread rubber illustrated in FIG. 1 located closer to the outer side in the tire width direction than the shoulder region Sh, the ratio UAO/CAO of the cross-sectional area UAO of the undertread rubber 16a to the cross-sectional area CAO of the cap tread rubber 16b is preferably not greater than 0.1 (Additional Embodiment 3).

Here, "region of the tread rubber, located closer to the outer side in the tire width direction than the shoulder region Sh" refers to a region extending from the outermost position in the tire width direction of the shoulder region Sh to the outermost position in the tire width direction of the tread rubber and is a concept including a region located closer to the outer side in the tire width direction than the ground contact edge.

Since the ratio UAO/CAO is set to 0.1 or less, it is possible to ensure sufficient rigidity at or near the ground contact edge and to further increase the steering stability performance. Note that the ratio UAO/CAO is more preferable set to 0.05 or less and most preferably to 0.

Additional Embodiment 4

In Basic Embodiment and an embodiment in which at least one of Additional Embodiments 1 to 3 is added to Basic Embodiment, it is preferable that the average tread thickness CRG of the center region Ce illustrated in FIG. 1 and the average tread thickness SRG of the shoulder regions Sh satisfy a relationship of 0.5 mm≤CRG−SRG≤2.5 mm (Additional Embodiment 4).

Here, "average tread thickness" refers to an average value of tread thickness data measured at arbitrary five locations spaced as evenly as possible excluding the main groove portion for each of the center region Ce and the shoulder region Sh.

Since the difference (CRG−SRG) is set to be not less than 0.5 mm, a difference of a certain degree or greater is provided between the tread thicknesses of the center region Ce and the shoulder regions Sh so that the center region Ce bulges in the tire radial direction with respect to the shoulder region Sh. Thus, it is possible to further reduce the rolling resistance without excessively increasing the ground contact width.

In contrast, since the difference (CRG−SRG) is to be not greater than 2.5 mm, it is possible to prevent the contact patch shape from being distorted without causing the center region Ce to excessively bulge in the tire radial direction with respect to the shoulder region Sh and to further reduce the rolling resistance.

The difference (CRG−SRG) is more preferably not less than 0.8 mm and not greater than 2.3 mm, and most preferably not less than 1.0 mm and not greater than 2.0 mm.

Additional Embodiment 5

In Basic Embodiment and an embodiment in which at least one of Additional Embodiments 1 to 4 is added to Basic Embodiment, it is preferable that at least two circumferential main grooves are provided, the outermost circumferential main grooves present at the outermost position in the tire width direction on each side of the tire equatorial plane CL is present in the shoulder region, and the outermost circumferential main groove is located on the inner side in the tire direction and is wider than the nearest circumferential main groove (Additional Embodiment 5). Here, the case where the outermost circumferential main groove is present in the shoulder regions also includes a case in which the main groove is partially included in the shoulder region.

For example, the case where two circumferential main grooves are provided includes a case in which one circumferential main groove is present on each side of the tire equatorial plane CL. Moreover, the case where three circumferential main grooves are provided includes a case in which one circumferential main groove is present at a position including the tire equatorial plane CL and one circumferential main groove is present on each of the outer sides in the tire width direction. In this way, the circumferential main groove may not necessarily be present at the position including the tire equatorial plane CL. However, preferably, at least one circumferential main groove is present on each side of the tire equatorial plane CL.

Since the outermost circumferential main groove present at the outermost position in the tire width direction is present in the shoulder region, it is possible to ensure drainage properties of the tire while reducing the influence on automobile noise.

Since the outermost circumferential main groove on each side of the tire equatorial plane is located on the inner side in the tire direction and is wider than the nearest circumferential main groove, the groove width of the circumferential main groove in the center region having high influence on tire noise is relatively small, and tire noise can be further reduced. Note that since the outermost circumferential main groove on each side of the tire equatorial plane is located on the inner side in the tire direction and is wider than the nearest circumferential main groove by 1.0 mm or greater, the above-described effects are achieved at a high level.

Example

Pneumatic tires according to Examples 1 to 6 and Comparative Examples 1 to 4 having a tire size of 195/65R15 91H, the tire meridian cross-sectional shape illustrated in FIG. 1 and the tread pattern illustrated in FIG. 2 are manufactured. Note that the detailed conditions of these pneumatic tires are as illustrated in Tables 1 and 2 below.

The pneumatic tires of Examples 1 to 6 and the pneumatic tires of Comparative Examples 1 to 4 manufactured in this manner are evaluated for tire noise, rolling resistance, and steering stability performance in accordance with the following procedures.

Tire Noise

The magnitude of the pass-by noise outside a vehicle when traveling on a road surface satisfying the ISO (International Organization for Standardization) 10844:1994 specification is evaluated. Specifically, a test vehicle mounted with each of the test tires is driven at a speed of 50 km/h on a test course, and the tire noise is measured 8 times from both sides in the width direction of the vehicle, and the average value thereof is calculated. The measurement results are expressed as dB differences with reference to Comparative Example 1. The results are shown in Tables 1 and 2.

(Rolling Resistance)

The test tires are mounted on wheels having a rim size of 15×6J, mounted on a drum testing machine, and a rolling resistance coefficient (RRC) is measured in accordance with ISO25280 under conditions of an air pressure of 210 kPa and an applied load of 4.82 kN. The evaluation results are represented by index values with respect to 100 of Comparative Example 1 using reciprocals of the measurement values. The higher index value, the lower the rolling resistance. The results are shown in Tables 1 and 2.

Steering Stability Performance

The test tires are mounted on wheels having a rim size of 15×6J, mounted on a passenger vehicle, and driven on a test course on a dry road surface, and sensory evaluation is performed by a test driver. Evaluation results are expressed as index values with respect to 100 of Comparative Example 1. The larger the index value, the superior the steering stability performance. The results are shown in Tables 1 and 2.

TABLE 1

|  | Example 1 | Example 2 | Example 3 | Example 4 | Example 5 | Example 6 |
|---|---|---|---|---|---|---|
| Average thickness (mm) of undertread rubber Center region (average thickness A) | 2 | 3 | 3 | 3 | 3 | 3 |
| Average thickness (mm) of undertread rubber Shoulder region (average thickness B) | 1 | 1 | 1 | 1 | 1 | 1 |
| Average thickness A > average thickness B satisfied? | Satisfied | Satisfied | Satisfied | Satisfied | Satisfied | Satisfied |
| Loss tangent tanδ at 60° C. Cap tread rubber (tanδA) | 0.12 | 0.12 | 0.12 | 0.12 | 0.12 | 0.12 |
| Loss tangent tanδ at 60° C. Undertread rubber (tanδB) | 0.06 | 0.06 | 0.06 | 0.06 | 0.06 | 0.06 |
| TanδA > tanδB satisfied? | Satisfied | Satisfied | Satisfied | Satisfied | Satisfied | Satisfied |
| Ratio CAI/UAI | 0.12 | 0.5 | 0.5 | 0.5 | 0.5 | 0.5 |
| Hardness A of cap tread rubber | 60 | 67 | 67 | 67 | 67 | 67 |
| Hardness B of undertread rubber | 57 | 57 | 57 | 57 | 57 | 57 |
| 5 < Hardness A - Hardness B < 15 satisfied? | Not satisfied | Satisfied | Satisfied | Satisfied | Satisfied | Satisfied |
| Groove area ratio in center region Area ratio A | 30 | 30 | 27 | 27 | 27 | 27 |
| Groove area ratio in shoulder region Area ratio B | 27 | 27 | 30 | 30 | 30 | 30 |
| Area ratio A < Area ratio B satisfied? | Not satisfied | Not satisfied | Satisfied | Satisfied | Satisfied | Satisfied |
| Cross-sectional area UAO of undertread rubber (mm$^2$) | 318 | 318 | 318 | 350 | 350 | 350 |
| Cross-sectional area CAO of cap tread rubber (mm$^2$) | 64 | 64 | 64 | 32 | 32 | 32 |
| Ratio UAO/CAO | 0.2 | 0.2 | 0.2 | 0.1 | 0.1 | 0.1 |
| Average tread thickness CRG of center region (mm) | 9.3 | 9.3 | 9.3 | 9.3 | 9.3 | 9.3 |
| Average tread thickness SRG of shoulder region (mm) | 9.3 | 9.3 | 9.3 | 9.3 | 8.3 | 8.3 |
| CRG-SRG | 0 | 0 | 0 | 0 | 1 | 1 |
| "Outermost circumferential main groove present at outermost position in tire width direction on each side of tire equatorial plane is present in shoulder region and outermost circumferential main groove is located inner side in tire direction and is wider than nearest circumferential groove" satisfied? | Not satisfied | Not satisfied | Not satisfied | Not satisfied | Not satisfied | Satisfied |
| Tire noise | −0.3 dB | −0.3 dB | −0.5 dB | −0.5 dB | −0.5 dB | −0.6 dB |
| Rolling resistance | 102 | 104 | 104 | 104 | 106 | 106 |
| Steering stability performance | 100 | 100 | 101 | 103 | 105 | 105 |

TABLE 2

|  | Comparative Example 1 | Comparative Example 2 | Comparative Example 3 | Comparative Example 4 |
|---|---|---|---|---|
| Average thickness (mm) of undertread rubber Center region (average thickness A) | 1 | 2 | 1 | 1 |
| Average thickness (mm) of undertread rubber Shoulder region (average thickness B) | 1 | 1 | 1 | 1 |
| Average thickness A > Average thickness B satisfied? | Not satisfied | Satisfied | Not satisfied | Not satisfied |
| Loss tangent tanδ at 60° C. Cap tread rubber (tanδA) | 0.12 | 0.12 | 0.12 | 0.12 |
| Loss tangent tanδ at 60° C. Undertread rubber (tanδB) | 0.12 | 0.12 | 0.06 | 0.12 |
| tanδA > tanδB satisfied? | Not satisfied | Not satisfied | Satisfied | Not satisfied |
| Ratio CAI/UAI | 0.12 | 0.12 | 0.12 | 0.2 |
| Hardness A of cap tread rubber | 60 | 60 | 60 | 60 |
| Hardness B of undertread rubber | 57 | 57 | 57 | 57 |
| 5 < Hardness A − Hardness B < 15 satisfied? | Not satisfied | Not satisfied | Not satisfied | Not satisfied |

TABLE 2-continued

|  | Comparative Example 1 | Comparative Example 2 | Comparative Example 3 | Comparative Example 4 |
|---|---|---|---|---|
| Groove area ratio in center region Area ratio A | 30 | 30 | 30 | 30 |
| Groove area ratio in shoulder region Area ratio B | 27 | 27 | 27 | 27 |
| Area ratio A < Area ratio B satisfied? | Not satisfied | Not satisfied | Not satisfied | Not satisfied |
| Cross-sectional area UAO of undertread rubber (mm$^2$) | 318 | 318 | 318 | 318 |
| Cross-sectional area CAO of cap tread rubber (mm$^2$) | 64 | 64 | 64 | 64 |
| Ratio UAO/CAO | 0.2 | 0.2 | 0.2 | 0.2 |
| Average tread thickness CRG of center region (mm) | 9.3 | 9.3 | 9.3 | 9.3 |
| Average tread thickness SRG of shoulder region (mm) | 9.3 | 9.3 | 9.3 | 9.3 |
| CRG-SRG | 0 | 0 | 0 | 0 |
| "Outermost circumferential main groove present at outermost position in tire width direction on each side of tire equatorial plane is present in shoulder region and outermost circumferential main groove is located on inner side in tire direction and is wider than nearest circumferential groove" satisfied? | Not satisfied | Not satisfied | Not satisfied | Not satisfied |
| Tire noise | Standard | −0.1 dB | Standard | Standard |
| Rolling resistance | 100 | 100 | 101 | 100 |
| Steering stability | 100 | 100 | 100 | 101 |

According to Table 1, it can be seen that the tire noise, the rolling resistance, and the steering stability performance are improved in a well-balanced manner in the pneumatic tires of Examples 1 to 6 which belong to the technical scope of the present technology (that is, improvements are added to the relationship between the average thicknesses of the undertread rubber in the center region and the shoulder region, the relationship between the loss tangents tan δ of the undertread rubber and the cap tread rubber, and the relationship between the cross-sectional area CAI of the cap tread rubber in the center region and the cross-sectional area UAI of the undertread rubber) as compared to pneumatic tires of Comparative Examples 1 to 4 which do not belong to the technical scope of the present technology.

The invention claimed is:

1. A pneumatic tire, comprising:
a carcass including at least one carcass ply;
a belt including a belt layer including cords, the belt being disposed on an outer side in a tire radial direction of the carcass; and
a tread rubber disposed on the outer side in the tire radial direction of the belt, the tread rubber constituting a portion of a tread portion, at least one circumferential main groove being formed in the tread portion, a sum of groove widths of the at least one circumferential main groove being 15% or greater of a ground contact width,
the tread rubber including an undertread rubber and a cap tread rubber formed on the outer side in the tire radial direction of the undertread rubber, the cap tread rubber being formed from rubber having a hardness higher than that of the undertread rubber,
in a state in which the pneumatic tire is mounted on a specified rim, inflated to 92% of a specified internal pressure, and loaded with a load of 75% of a maximum load capacity, when two regions at a center in a tire width direction obtained by dividing a tire ground contact width into four regions in a tire meridian cross-sectional view are a center region and remaining two regions are shoulder regions, an average thickness of the undertread rubber in the center region being greater than that of each shoulder region and the average thickness of the undertread rubber on a tire equatorial plane is greater than that of any location of each shoulder region,
a loss tangent tan δ at 60° C. of the cap tread rubber being higher than that of the undertread rubber,
in a region of the center region, located closer to an inner side in the tire radial direction than an imaginary line that extends in parallel to a tire profile line at a position located 1.6 mm on the outer side in the tire radial direction from a groove bottom of the circumferential main groove, a ratio CAI/UAI of a cross-sectional area CAI of the cap tread rubber to a cross-sectional area UAI of the undertread rubber being not less than 0.15 and not greater than 0.50, and
a maximum thickness of the undertread rubber in each of the shoulder regions being less than a maximum thickness of the undertread rubber in the center region;
wherein axially outer boundaries of the center region are defined on an axially inner side of axially outermost circumferential main grooves.

2. The pneumatic tire according to claim 1, wherein a difference between a hardness of the cap tread rubber and a hardness of the undertread rubber is greater than 5 and less than 15 in JIS hardness.

3. The pneumatic tire according to claim 2, wherein a groove area ratio in the center region is smaller than a groove area ratio in each shoulder region.

4. The pneumatic tire according to claim 3, wherein a ratio UAO/CAO of a cross-sectional area UAO of the undertread rubber to a cross-sectional area CAO of the cap tread rubber is not greater than 0.1 in a region of the tread rubber, located closer to the outer side in the tire width direction than each shoulder region.

5. The pneumatic tire according to claim 4, wherein an average tread thickness CRG of the center region and an average tread thickness SRG of the shoulder regions satisfy a relationship of 0.5 mm≤CRG−SRG≤2.5 mm.

6. The pneumatic tire according to claim 5, wherein at least two circumferential main grooves are provided, an outermost circumferential main groove present at an outermost position in the tire width direction on each side of a tire equatorial plane is present in each shoulder region and is wider than a nearest circumferential main groove located on an inner side in a tire width direction of the outermost circumferential main groove.

7. The pneumatic tire according to claim 1, wherein a groove area ratio in the center region is smaller than a groove area ratio in each shoulder region.

8. The pneumatic tire according to claim 1, wherein a ratio UAO/CAO of a cross-sectional area UAO of the undertread rubber to a cross-sectional area CAO of the cap tread rubber is not greater than 0.1 in a region of the tread rubber, located closer to the outer side in the tire width direction than each shoulder region.

9. The pneumatic tire according to claim 1, wherein an average tread thickness CRG of the center region and an average tread thickness SRG of the shoulder regions satisfy a relationship of 0.5 mm≤CRG−SRG≤2.5 mm.

10. The pneumatic tire according to claim 1, wherein at least two circumferential main grooves are provided, an outermost circumferential main groove present at an outermost position in the tire width direction on each side of a tire equatorial plane is present in each shoulder region and is wider than a nearest circumferential main groove located on an inner side in a tire width direction of the outermost circumferential main groove.

11. The pneumatic tire according to claim 1, wherein the undertread rubber extends to and forms a part of an outer surface of a sidewall of the pneumatic tire.

12. A pneumatic tire, comprising:
a carcass including at least one carcass ply;
a belt including a belt layer including cords, the belt being disposed on an outer side in a tire radial direction of the carcass; and
a tread rubber disposed on the outer side in the tire radial direction of the belt, the tread rubber constituting a portion of a tread portion, at least one circumferential main groove being formed in the tread portion, a sum of groove widths of the at least one circumferential main groove being 15% or greater of a ground contact width,
the tread rubber including an undertread rubber and a cap tread rubber formed on the outer side in the tire radial direction of the undertread rubber, the cap tread rubber being formed from rubber having a hardness higher than that of the undertread rubber,
in a state in which the pneumatic tire is mounted on a specified rim, inflated to 92% of a specified internal pressure, and loaded with a load of 75% of a maximum load capacity, when two regions at a center in a tire width direction obtained by dividing a tire ground contact width into four regions in a tire meridian cross-sectional view are a center region and remaining two regions are shoulder regions, an average thickness of the undertread rubber in the center region being greater than that of each shoulder region,
a loss tangent tan δ at 60° C. of the cap tread rubber being higher than that of the undertread rubber,
in a region of the center region, located closer to an inner side in the tire radial direction than an imaginary line that extends in parallel to a tire profile line at a position located 1.6 mm on the outer side in the tire radial direction from a groove bottom of the circumferential main groove, a ratio CAI/UAI of a cross-sectional area CAI of the cap tread rubber to a cross-sectional area UAI of the undertread rubber being not less than 0.51 and not greater than 0.95, and
a maximum thickness of the undertread rubber in each of the shoulder regions being less than a maximum thickness of the undertread rubber in the center region.

13. A pneumatic tire, comprising:
a carcass including at least one carcass ply;
a belt including a belt layer including cords, the belt being disposed on an outer side in a tire radial direction of the carcass; and
a tread rubber disposed on the outer side in the tire radial direction of the belt, the tread rubber constituting a portion of a tread portion, at least one circumferential main groove being formed in the tread portion, a sum of groove widths of the at least one circumferential main groove being 15% or greater of a ground contact width,
the tread rubber including an undertread rubber and a cap tread rubber formed on the outer side in the tire radial direction of the undertread rubber, the cap tread rubber being formed from rubber having a hardness higher than that of the undertread rubber,
in a state in which the pneumatic tire is mounted on a specified rim, inflated to 92% of a specified internal pressure, and loaded with a load of 75% of a maximum load capacity, when two regions at a center in a tire width direction obtained by dividing a tire ground contact width into four regions in a tire meridian cross-sectional view are a center region and remaining two regions are shoulder regions, an average thickness of the undertread rubber in the center region being greater than that of each shoulder region,
a loss tangent tan δ at 60° C. of the cap tread rubber being higher than that of the undertread rubber,
in a region of the center region, located closer to an inner side in the tire radial direction than an imaginary line that extends in parallel to a tire profile line at a position located 1.6 mm on the outer side in the tire radial direction from a groove bottom of the circumferential main groove, a ratio CAI/UAI of a cross-sectional area CAI of the cap tread rubber to a cross-sectional area UAI of the undertread rubber being not less than 0.15 and not greater than 0.95, and
a maximum thickness of the undertread rubber in each of the shoulder regions being less than a maximum thickness of the undertread rubber in the center region; wherein the undertread rubber extends to and forms a part of an outer surface of a sidewall of the pneumatic tire.

* * * * *